(12) United States Patent
Braness et al.

(10) Patent No.: US 9,270,720 B2
(45) Date of Patent: *Feb. 23, 2016

(54) SYSTEMS AND METHODS FOR AUTOMATICALLY GENERATING TOP LEVEL INDEX FILES

(71) Applicant: Sonic IP, Inc., San Diego, CA (US)

(72) Inventors: Jason Braness, San Diego, CA (US); Evan Wallin, San Diego, CA (US); Ederson Ferreira, Campinas/SP (BR)

(73) Assignee: SONIC IP, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,392

(22) Filed: Jul. 21, 2014

(65) Prior Publication Data

US 2015/0019866 A1 Jan. 15, 2015

Related U.S. Application Data

(63) Continuation of application No. 13/341,789, filed on Dec. 30, 2011, now Pat. No. 8,787,570.

(60) Provisional application No. 61/529,403, filed on Aug. 31, 2011.

(51) Int. Cl.
*H04L 29/06* (2006.01)
*H04N 21/239* (2011.01)
(Continued)

(52) U.S. Cl.
CPC ............... *H04L 65/60* (2013.01); *G06F 21/10* (2013.01); *H04L 63/0428* (2013.01);
(Continued)

(58) Field of Classification Search
CPC ....................................................... H04L 65/60
USPC ............................................................ 713/168
See application file for complete search history.

(56) References Cited

U.S. PATENT DOCUMENTS 6,154,172 A 11/2000 Piccionelli et al.
6,741,252 B2 * 5/2004 Hijiri et al. .................... 345/473
(Continued)

FOREIGN PATENT DOCUMENTS

JP 2005107725 A 4/2005
JP 2011087103 A 4/2011
(Continued)

OTHER PUBLICATIONS

International Preliminary Report on Patentability for International Application No. PCT/US2011/068274, Mailed Mar. 4, 2014, 13 pgs.
(Continued)

*Primary Examiner* — Dant Shaiffer Harriman
(74) *Attorney, Agent, or Firm* — KPPB LLP

(57) ABSTRACT

Systems and methods for automatically generating top level index files for use in adaptive bitrate streaming in accordance with embodiments of the invention are disclosed. One embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, and sending the top level index file to the playback device using the playback server.

18 Claims, 9 Drawing Sheets

(51) Int. Cl.
*H04N 21/258* (2011.01)
*H04N 21/262* (2011.01)
*H04N 21/472* (2011.01)
*H04N 21/658* (2011.01)
*H04N 21/8352* (2011.01)
*G06F 21/10* (2013.01)
*H04L 29/08* (2006.01)

(52) U.S. Cl.
CPC ........... *H04L 67/06* (2013.01); *H04N 21/2393* (2013.01); *H04N 21/25825* (2013.01); *H04N 21/26258* (2013.01); *H04N 21/47202* (2013.01); *H04N 21/6581* (2013.01); *H04N 21/8352* (2013.01)

(56) References Cited

U.S. PATENT DOCUMENTS

| | | | |
|---|---|---|---|
| 7,177,818 B2 * | 2/2007 | Nair | 705/346 |
| 7,295,752 B1 | 11/2007 | Jain et al. | |
| 7,925,203 B2 * | 4/2011 | Lane et al. | 455/3.06 |
| 8,171,518 B2 | 5/2012 | White | |
| 8,191,097 B1 | 5/2012 | Armstrong et al. | |
| 8,266,115 B1 * | 9/2012 | Park et al. | 707/692 |
| 8,787,570 B2 | 7/2014 | Braness et al. | |
| 8,806,188 B2 | 8/2014 | Braness et al. | |
| 2003/0078930 A1 | 4/2003 | Surcouf et al. | |
| 2003/0225696 A1 * | 12/2003 | Niwa | 705/50 |
| 2005/0195975 A1 | 9/2005 | Kawakita | |
| 2007/0074254 A1 * | 3/2007 | Sloo | 725/52 |
| 2008/0282302 A1 | 11/2008 | Steelberg et al. | |
| 2008/0301734 A1 * | 12/2008 | Goldeen et al. | 725/44 |
| 2009/0187957 A1 * | 7/2009 | Avkarogullari | 725/109 |
| 2010/0191590 A1 | 7/2010 | Hakkarainen et al. | |
| 2011/0179356 A1 | 7/2011 | Bassali et al. | |
| 2012/0059912 A1 | 3/2012 | Fernando | |
| 2012/0209961 A1 | 8/2012 | McCoy et al. | |
| 2013/0018632 A1 * | 1/2013 | Field et al. | 702/183 |
| 2013/0051554 A1 | 2/2013 | Braness et al. | |
| 2013/0054958 A1 | 2/2013 | Braness et al. | |
| 2013/0080267 A1 | 3/2013 | McGowan | |

FOREIGN PATENT DOCUMENTS

| | | |
|---|---|---|
| JP | 2013509818 A | 3/2013 |
| JP | 2014528376 A | 10/2014 |
| WO | 2011038013 A2 | 3/2011 |
| WO | 2011053658 A1 | 5/2011 |
| WO | 2013032517 A1 | 3/2013 |

OTHER PUBLICATIONS

International Search Report and Written Opinion for International Application PCT/US2011/68274, Report Completed Apr. 10, 2012, 16 pgs.

Oliveira et al., "Dynamic Generation of FMIL-Based Multimedia Interfaces", Journal of Multimedia, Oct. 2008, vol. 3, No. 4, pp. 14-25.

Wei, "Pardon Our Dust", Hulu Blog, printed Apr. 30, 2014 from http://blog.hulu.com.2010/05/13/pardon-our-dust, 10 pgs.

Wowza Media Systems, "Using dynamically generated SMIL file possible:", printed Apr. 30, 2014 from http://www.wowza.com.forums/showthread.php?12458-using-dynamically-generated-SMIL-file-possible, 3 pgs.

Stockhammer, "Dynamic Adaptive Streaming over HTTP—Standards and Design Principles", MMSys '11 Proceedings of the second annual ACM conference on Multimedia systems, United States, ACM, URL, http://dl.acm.org/citation.cfm?id=1943572, Feb. 23, 2011,, p. 133-143.

* cited by examiner

SYSTEMS AND METHODS FOR AUTOMATICALLY GENERATING TOP LEVEL INDEX FILES

CROSS REFERENCE TO RELATED APPLICATIONS

This application is a continuation application of U.S. patent application Ser. No. 13/341,789 filed Dec. 30, 2011, which application claimed priority to U.S. Provisional Application Ser. No. 61/529,403, to Braness et al. entitled "Automatic Generation of SMIL Files", filed Aug. 31, 2011, the entirety of which is incorporated herein by reference.

FIELD OF THE INVENTION

The present invention generally relates to streaming media and more specifically to the automatic generation of top level index files for use in adaptive bitrate streaming.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the playback device's network bandwidth and video decoding capacity) in real time and adjusting the quality of the streamed media accordingly. Typically, the source media is encoded as separate streams having different maximum bitrates and the playback device or client switches between streaming the different encodings depending on available resources. When a playback device commences adaptive bitrate streaming, the playback device typically starts by requesting portions of media from an initial set of streams. As the playback device downloads the requested media, the playback device can measure the available bandwidth. In the event that the available bandwidth increases or decreases, the playback device can switch to higher or lower bitrate streams.

Adaptive streaming solutions typically utilize Hypertext Transfer Protocol (HTTP), published by the Internet Engineering Task Force and the World Wide Web Consortium as RFC 2616, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

SUMMARY OF THE INVENTION

Systems and methods in accordance with embodiments of the invention automatically generate top level index files for use in adaptive bitrate streaming. One embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, and sending the top level index file to the playback device using the playback server.

In a further embodiment of the method of the invention, the request from the playback device also includes information describing the capabilities of the playback device, and the playback server filters the list of assets based upon the capabilities of the playback device.

In another embodiment of the method of the invention, the information describing the capabilities of the playback device is a product identifier, and the method further including retrieving at least one device capability based upon the product identifier using the playback server.

In a still further embodiment of the method of the invention, the device capability is at least one device capability selected from the group consisting of: display aspect ratio, anticipated maximum network connection data rate, device outputs, supported formats, device buffer size, device resolution, device region, and device language.

In still another embodiment of the method of the invention, the at least one predetermined criterion includes whether the playback device has access to assets associated with premium content.

In a yet further embodiment of the method of the invention, the request from the playback device also includes information indicative of the geographic location of the playback device, and the at least one predetermined criterion includes whether an asset is permitted to be played back in the geographic location indicated by the request.

In yet another embodiment of the method of the invention, the at least one predetermined criterion includes filtering the assets based upon at least one language.

In a further embodiment again of the method of the invention, the playback server maintains a database of assets associated with specific pieces of content.

In another embodiment again of the method of the invention, the top level index file is a SMIL file.

In a further additional embodiment of the method of the invention, generating a top level index file describing each asset in the filtered list of assets using the playback server includes generating an XML string including a URI for each asset.

Another additional embodiment of the method of the invention also includes generating an XML string including a SWITCH element to describe alternative streams for use in adaptive bitrate streaming.

A still yet further embodiment of the method of the invention also includes generating an XML string including an EXCL element to describe alternative streams for use in conventional streaming.

In still yet another embodiment of the method of the invention, the URI references a container file and the XML string for each assets includes an element that defines the size of a header section of the container file.

In a still further embodiment again of the method of the invention, the XML string includes an element that identifies the encoding of the asset.

In another embodiment again of the method of the invention, the XML string of a video asset includes at least one element selected from the group including an element that describes the maximum bitrate of the video, an element that describes the width and height of the video, and an element that describes the video buffer verifier size of the video.

A still further additional embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, sending the top level index file to the playback device using the playback server, retrieving cryptographic information using the playback server, where the cryptographic information is used to access protected streams described in the top level index file, and providing the cryptographic information to the playback device using the playback server.

In still another additional embodiment of the method of the invention, the cryptographic information is retrieved by the playback server in response to a request from a playback device to playback the content.

In a yet further embodiment again of the method of the invention, the cryptographic information is retrieved by the playback server from a database of cryptographic information and is encrypted so that the playback device can access the cryptographic information using cryptographic information stored on the playback device.

In yet another embodiment again of the method of the invention, the cryptographic information is retrieved by the playback server from a digital rights management server.

A yet further additional embodiment of the method of the invention also includes confirming that the number of devices on which the user is currently playing back content is less than a predetermined concurrency limit.

Yet another additional embodiment of the method of the invention also includes receiving a play event report from the playback device at the playback server.

A further additional embodiment again of the method of the invention also includes providing a command to the playback device using the playback server in response to the play event report.

In another additional embodiment again of the method of the invention, the play event report includes a playback location.

A still yet further embodiment again of the method of the invention also includes sending a command to resume playback at the playback location indicated in the play event report to a second playback device.

Still yet another embodiment again of the method of the invention also includes sending a command to stop playback to the playback device that generated the play event report using the playback server.

A further embodiment of the invention includes a database that stores descriptions of assets associated with specific pieces of content, and a processor configured using a playback management application. In addition, the playback management application configures the processor to: receive a request from a playback device identifying a piece of content; retrieve a list of assets associated with the identified piece of content; filter the list of assets using at least one predetermined criterion; generate a top level index file describing each asset in the filtered list of assets; and send the top level index file to the playback device.

Another embodiment includes the request from the playback device also includes information describing the capabilities of the playback device, and the playback management application configures the processor to filter the list of assets based upon the capabilities of the playback device.

In a still further embodiment, the information describing the capabilities of the playback device is a product identifier, and the playback management application further configures the processor to retrieve at least one device capability based upon the product identifier.

In still another embodiment, wherein the device capability is at least one device capability selected from the group consisting of: display aspect ratio, anticipated maximum network connection data rate, device outputs, supported formats, device buffer size, display resolution, device region, and device language.

In a yet further embodiment, the at least one predetermined criterion includes whether the playback device has access to assets associated with premium content.

In yet another embodiment, the request from the playback device also includes information indicative of the geographic location of the playback device, and the at least one predetermined criterion includes whether an asset is permitted to be played back in the geographic location indicated by the request.

In a further embodiment again, the at least one predetermined criterion includes filtering the assets based upon one or more languages.

In another embodiment again, the playback server maintains a database of assets associated with specific pieces of content.

In a further additional embodiment, the top level index file is a SMIL file.

In another additional embodiment, the playback management application configures the processor to generate a top level index file describing each asset in the filtered list of assets by configuring the processor to generate an XML string including a URI for each asset.

In a still yet further embodiment, the playback management application further configures the processor to generate an XML string including a SWITCH element to describe alternative streams for use in adaptive bitrate streaming.

In still yet another embodiment, the playback management application further configures the processor to generate an XML string including an EXCL element to describe alternative streams for use in conventional streaming.

In a still further embodiment again, the URI references a container file and the XML string for each asset includes an element that defines the size of a header section of the container file.

In still another embodiment again, the XML string includes an element that identifies the encoding of the asset.

In a still further additional embodiment, the XML string of a video asset includes at least one element selected from the group including an element that describes the maximum bitrate of the video, an element that describes the width and height of the video, and an element that describes the video buffer verifier size of the video.

In still another additional embodiment, playback management application further configures the processor to retrieve cryptographic information, where the cryptographic information is used to access protected streams described in the top level index file, and provide the cryptographic information to the playback device.

In a yet further embodiment again, the playback management application configures the processor to retrieve the cryptographic information in response to a request from a playback device to playback the content.

In yet another embodiment again, the playback management application configures the processor to retrieve the cryptographic information from a database of cryptographic information, and encrypt the retrieved cryptographic information so that the playback device can access the retrieved cryptographic information in the clear using cryptographic information stored on the playback device.

In a yet further additional embodiment, the playback management application configures the processor to retrieve the cryptographic information from a digital rights management server.

In yet another additional embodiment, the playback management application configures the processor to confirm that the number of devices on which the user is playing back content is less than a predetermined concurrency limit.

In a further additional embodiment again, the playback management application configures the processor to receive a play event report from the playback device.

In another additional embodiment again, the playback management application configures the processor to provide a command to the playback device in response to the play event report.

In a still yet further embodiment again, the play event report includes a playback location.

In still yet another embodiment again, the playback management application further configures the processor to send a command to resume playback at the playback location indicated in the play event report to a second playback device.

In a yet further additional embodiment again, the playback management application further configures the processor to send a command to stop playback to the playback device that generated the play event report using the playback server.

Another further embodiment includes a machine readable medium containing processor instructions, where execution of the instructions by a processor causes the processor to perform a process including receiving a request from a playback device identifying a piece of content, retrieving a list of assets associated with the identified piece of content, filtering the list of assets using at least one predetermined criterion, generating a top level index file describing each asset in the filtered list of assets; and sending the top level index file to the playback device.

In still another further embodiment, the execution of the instructions by a processor causes the processor to perform a process further including retrieving cryptographic information, where the cryptographic information is used to access protected streams described in the top level index file, and providing the cryptographic information to the playback device.

DETAILED DISCLOSURE OF THE INVENTION

Turning now to the drawings, systems and methods for automatically generating top level index files for use in adaptive bitrate streaming in accordance with embodiments of the invention are illustrated. A top level index is a file that describes the location and content of container files containing streams of media (e.g. audio, video, metadata, and subtitles) that can be utilized by the playback device to stream and playback content. In adaptive bitrate streaming systems, the top level index file typically references the alternative streams that the playback device can switch between. In many embodiments, a top level index file is generated in response to a request from a playback device. In several embodiments, the process of generating the top level index file involves determining all of the assets or container files containing streams associated with a specific piece of content and then filtering the assets based upon one or more predetermined criterion. In a number of embodiments, the assets are filtered based upon predetermined criteria including (but not limited to) business rules defined by the content owner, device capabilities, and/or information associated with a user account. In many embodiments, the top level video file that is generated is a SMIL file. In other embodiments, any of a variety of file formats can be utilized to generate top level index files in accordance with embodiments of the invention.

In several embodiments, a playback server automatically generates top level index files in response to a request from a playback device and the playback server can also provide the playback device with cryptographic information enabling playback of protected streams of content. In a number of embodiments, the playback device provides play event reports to the playback server and the playback server can track the playback location of the streams being played back by the playback device. The playback location can be utilized to enable a user to shift between watching content on different playback devices. The user can commence playback on a first device and then request playback on a second device. When the playback server receives a playback request from a second playback device, the playback server can suspend playback on the first playback device and provide an instruction to the second playback device to commence playback at the last playback location reported by the first playback device. Playback devices, playback servers and processes for automatically generating top level index files in response to requests from playback devices in accordance with embodiments of the invention are discussed further below.

Streaming System Architecture

Figure 1:
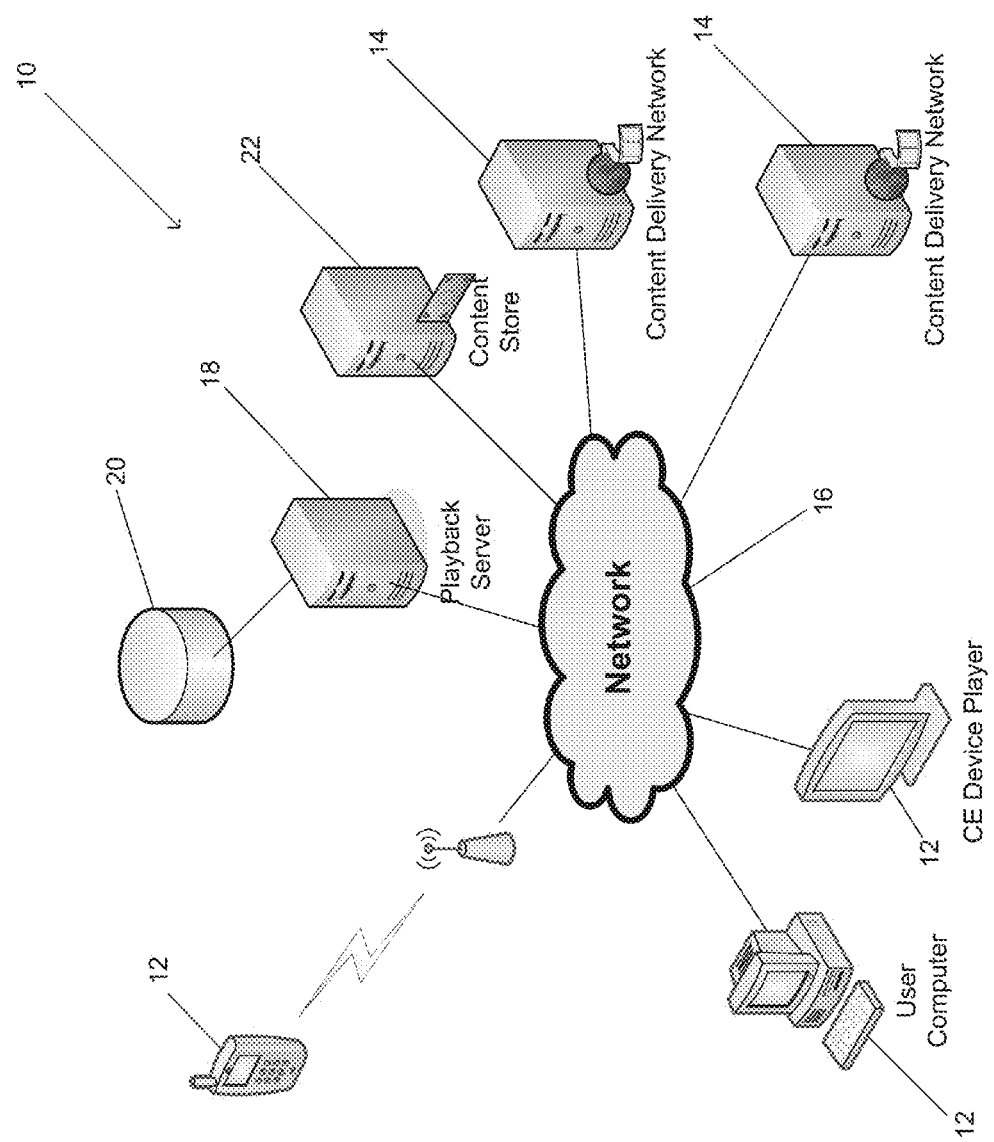
FIG. 1 is a network diagram of a streaming system including a playback server in accordance with an embodiment of the invention.

Adaptive bitrate streaming systems in accordance with many embodiments of the invention include a playback server that automatically generates top level index files in response to requests from playback devices. A streaming system in accordance with an embodiment of the invention is illustrated in FIG. 1. The streaming system 10 includes a number of playback devices 12 configured to request streaming of content from remote servers within content delivery networks (CDNs) 14 via a network 16 such as the Internet. In order to stream content, the playback device obtains a top level index file that is automatically generated by the playback server 18 using a database 20 of available assets (i.e. container files containing streams of content associated with specific titles) and a set of predetermined filters or criteria.

To perform adaptive bitrate streaming, the playback devices 12 select content from different alternative streams described in the top level index file. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. In many embodiments, the top level index file generated by the playback server 18 describes at least the maximum bitrates of each of the alternative streams. The playback device can select one or more streams for conventional streaming or can switch between alternative streams to perform adaptive bitrate streaming.

In several embodiments, playback devices 12 are able to purchase content for streaming via one or more online content stores 22. In many instances, the playback device purchases content via an online content store and receives an electronic token or ticket that the playback device can provide to the playback server 18 to obtain access to the purchased content. When the playback server 18 receives the ticket, the playback server automatically generates a top level index file for the playback device using information stored in the database 20. The playback server is typically a conventional server system configured using a playback management application and in such a way that the playback server can access the database 20. In a number of embodiments, playback devices 12 provide information concerning their playback capabilities to the playback server 18 and the server automatically generates top level index files by filtering assets associated with a purchased piece of content based upon device capabilities. Such capabilities include but are not limited to playback capabilities, display aspect ratio, and/or anticipated maximum network connection data rate. In a number of embodiments, the capabilities of a specific playback device 12 are communicated to the playback server 18 in the form of a product identifier or product ID. The playback server 18 can maintain a database of product IDs and associated device capabilities, and can utilize the product IDs provided by playback devices to retrieve the associated device capabilities and apply filters to lists of available assets when generating a top level index file. Systems and methods for assigning product IDs and associating them with information concerning the capabilities of the devices to which the product IDs are assigned are described in U.S. Provisional Patent Application Ser. No. 61/581,598 to Grab et al., entitled "Systems and Methods for Identifying Consumer Electronic Products Using a Playback Device with a Product Identifier", filed Dec. 29, 2011. The disclosure of U.S. Provisional Patent Application Ser. No. 61/581,598 is incorporated by reference herein in its entirety. Other filters that can be applied by playback servers in accordance with embodiments of the invention include (but are not limited to) filters based upon the location of the playback device (i.e. country/region), and languages associated with a specific user. Various filters that can be applied to generate a top level index file in accordance with embodiments of the invention are discussed further below.

When the playback server 18 receives a play request, the playback server retrieves cryptographic information required to playback protected streams of content. The playback device can then request portions of container files containing streams of content from one or more servers within a content delivery network 14 and can use the cryptographic information to access protected content. Systems and methods for the digital rights management of protected streams used in adaptive bitrate streaming are described in U.S. patent application Ser. No. 13/340,632 to Kiefer et al., entitled "Systems and Methods for Playing Back Alternative Streams of Protected Content Protected Using Common Cryptographic Information", filed Dec. 29, 2011. The disclosure of U.S. patent application Ser. No. 13/340,632 is incorporated by reference herein in its entirety.

During playback, playback devices 12 can provide play event reports to the playback server 18. The play event reports can include information including (but not limited to) the current stream(s) from which the playback device is requesting data and the current playback location of the playback device. In many embodiments, the playback server 18 responds to the play event reports by instructing the playback device to continue playback or to cease playback. In several embodiments, the playback server enforces concurrency limits on playback devices. The term concurrency limit in the context of adaptive bitrate streaming systems describes the number of playback devices that can simultaneously playback content associated with a specific user account. When a concurrency limit is exceeded, the playback server 18 can send an instruction to a playback device 12 directing it to cease playback. In a number of embodiments, playback location information provided in play event reports can be utilized to enable a user to switch from playing back content on a first device to playing back content on a second device and the second device will automatically resume content playback at the last playback location of the first playback device. In addition, a user that suspends playback on a first playback device can resume playback on the same playback device or a second playback device at some later point in time.

Although a specific streaming system is illustrated in FIG. 1, playback servers that automatically generate top level index files can be incorporated into any of a variety of streaming system architectures in accordance with embodiments of the invention. Playback devices that can be utilized to perform network bandwidth measurements during a streaming session in accordance with embodiments of the invention are discussed further below.

Playback Devices

Figure 2:
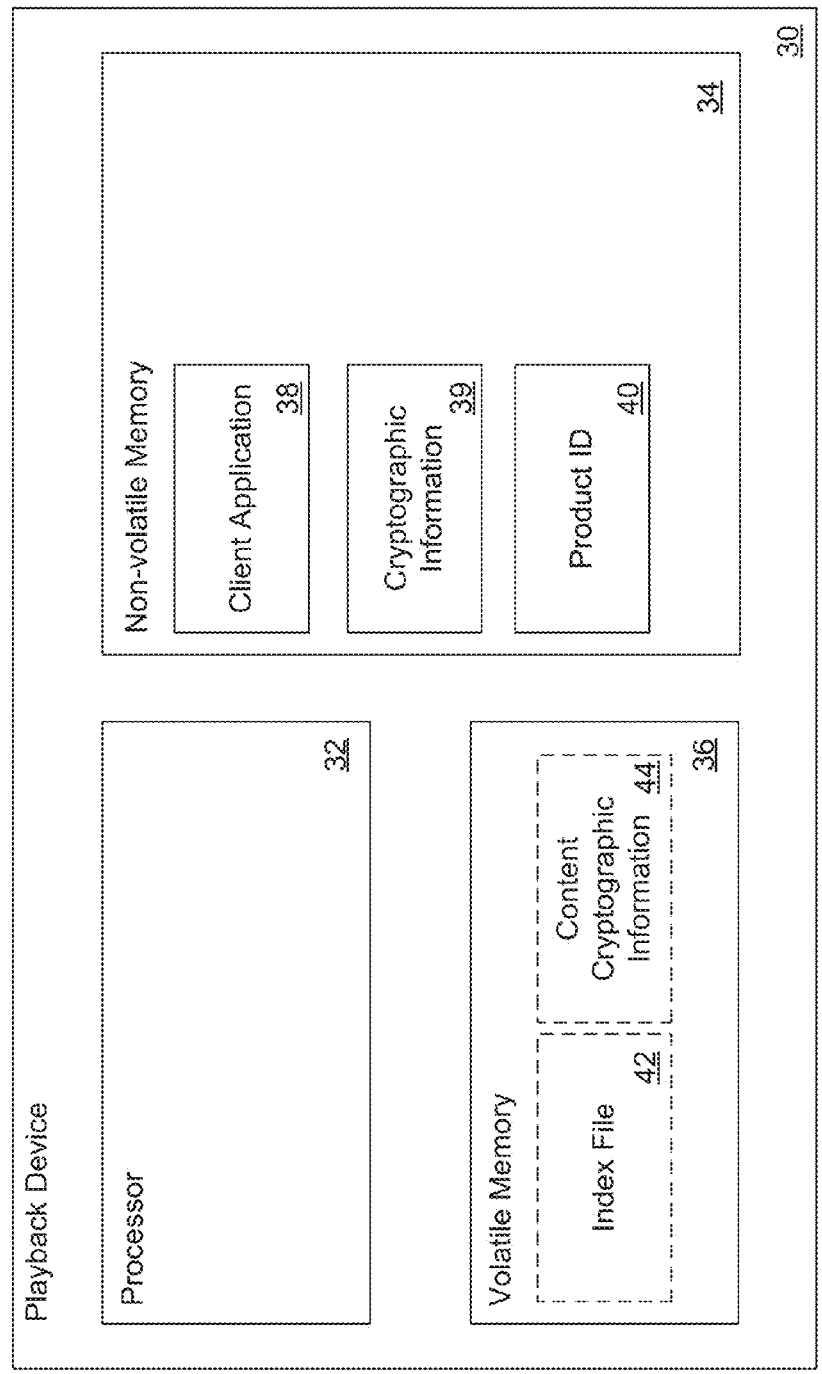
FIG. 2 is a system diagram of a playback device in accordance with an embodiment of the invention.

In the embodiment illustrated in FIG. 1, playback devices include personal computers, CE players, and mobile phones. In other embodiments, playback devices can include consumer electronics devices such as DVD players, Blu-ray players, televisions, set top boxes, video game consoles, tablets, and other devices that are capable of connecting to a server and playing back encoded media. The basic architecture of a playback device in accordance with an embodiment of the invention is illustrated in FIG. 2. The playback device 30 includes a processor 32 in communication with non-volatile memory 34 and volatile memory 36. In the illustrated embodiment, the non-volatile memory includes a client application 38 that configures the processor and the playback device to stream content from a remote server. The non-volatile memory 34 also includes device cryptographic data 39 that can be utilized in accessing encrypted content and a product ID 40 that can be utilized to identify the capabilities of the playback device.

During operation, the client application 38 can configure the playback device to purchase content from a content store and request a top level index file 42 from a playback server. As noted above, the request for a top level index file can include the product ID 40 of the playback device, which can be used to filter the assets that are described in the top level index file. When the top level index file 42 is received from the playback server, the client application 38 configures the playback device to store the top level index file 42 in memory 36 and request content cryptographic information 44 to playback requested streams from the playback server (or a separate DRM server) in response to a user instruction to playback content. The content cryptographic information 44 received from the playback server can also be stored in memory 36. The client application 38 can then configure the playback device 30 to playback content by requesting portions of container files containing content from a server within a content delivery network. The specific container files selected by the client application 38 can be determined based upon the information available to the client application within the top level index file 42. When the playback device receives the requested portions of the container files, the client application 38 can access protected content within the requested portions of the container files using the content cryptographic information 44. The client application can continue to request and playback content from different container files depending upon the prevailing streaming conditions until a user instruction suspending playback is received or until playback completes.

Although a specific playback device architecture is illustrated in FIG. 2, any of a variety of architectures including architectures where the client application is located on disk or some other form of storage and is loaded into volatile memory at runtime can be utilized to implement playback devices for use in adaptive bitrate streaming systems in accordance with embodiments of the invention. Furthermore, any of a variety of system architectures including (but not limited) to the system architecture illustrated in FIG. 1 can be utilized to perform adaptive bitrate streaming using top level index files that are automatically generated in response to request from playback devices in accordance with embodiments of the invention.

Content Playback

Figure 3:
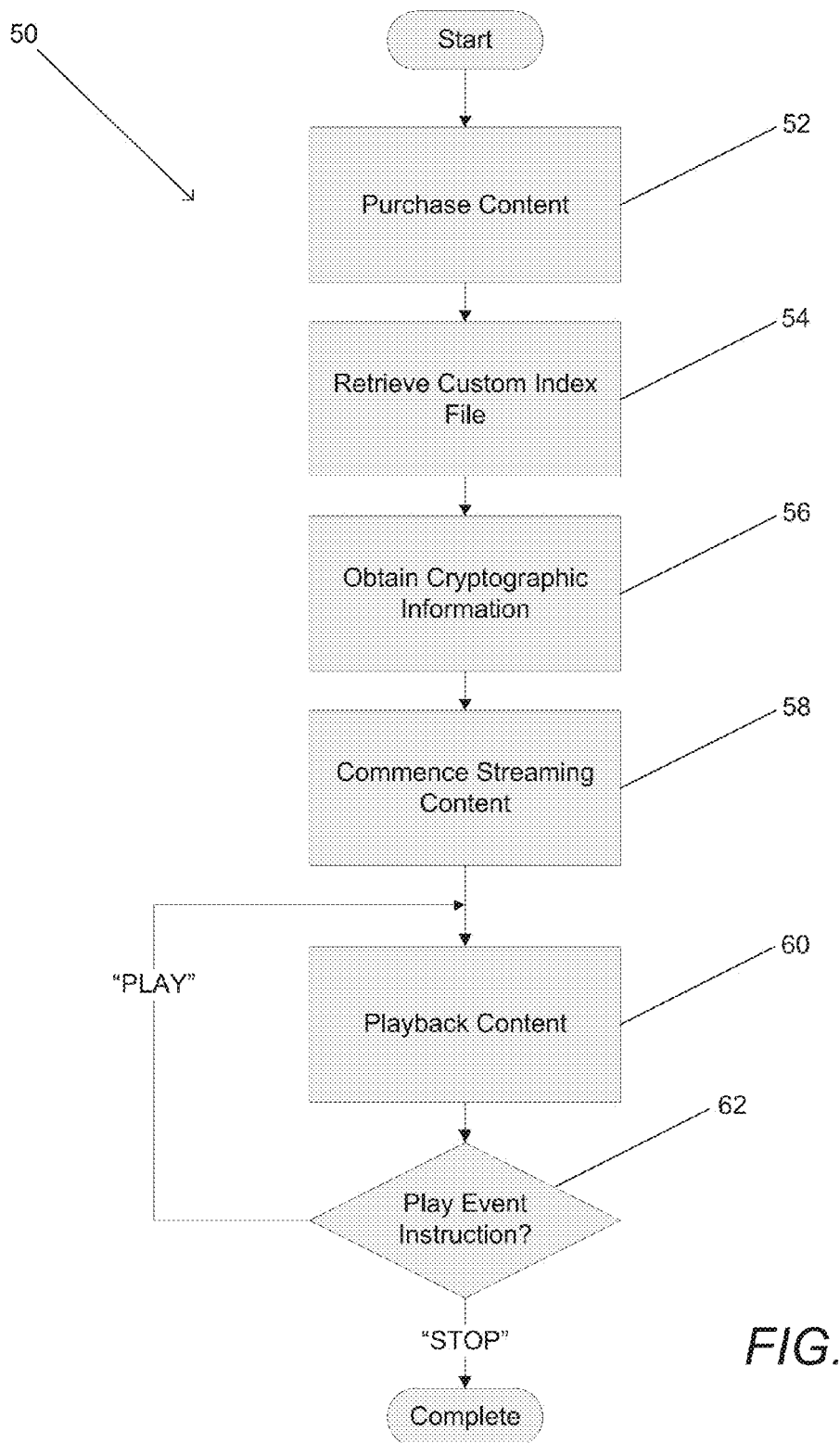
FIG. 3 is a flow chart illustrating a process for obtaining a top level index file and cryptographic information from a playback server to stream content from a content distribution network in accordance with an embodiment of the invention.

A process for playing back content using a top level index file generated in response to a request from a playback device in accordance with an embodiment of the invention is illustrated in FIG. 3. The process 50 includes purchase (52) of content. The purchase can be performed using a playback device or can be performed using another device. In many embodiments, the purchase is made via an online content store that provides an electronic ticket or token that can be utilized to obtain access to the content. In order to access the content, the playback device requests the generation of a top level index file customized for the specific playback device from a playback server. In many embodiments, the top level index file is customized in the sense that the playback server filters all available assets to generate a top level index file that describes the assets that are available and/or best suited to playback by the playback device. Once the custom top level index file is retrieved (54), the playback device obtains (56) cryptographic information that enables playback of protected streams identified within the top level index file. In many embodiments, playback devices wait until a playback request is received from a user and then requests cryptographic information from the playback server.

When a playback device possesses a top level index file and any necessary cryptographic information, the playback device can commence streaming (58) content by requesting portions of one or more container files containing encoded media. Any of a variety of processes can be utilized to select initial streams including (but not limited to) selecting the lowest bitrate streams, performing a bandwidth probe in a manner similar to the manner disclosed in U.S. patent application Ser. No. 13/251,061 to van der Schaar et al., entitled "Systems and Methods for Determining Available Bandwidth and Performing Initial Stream Selection When Commencing Streaming Using Hypertext Transfer Protocol", filed Sep. 30, 2011, or estimating available bandwidth using another technique. The disclosure of U.S. patent application Ser. No. 13/251,061 is incorporated by reference herein in its entirety.

Once playback commences (60), adaptive bitrate streaming can be performed. During playback, play event reports can be provided to a playback server to provide information concerning the playback status of the playback device periodically or in response to various events including (but not limited to) user instructions received by the playback device. When a play event report is provided to the playback server, the playback server can provide a play event instruction to the playback device. In the illustrated embodiment, the play event instructions that can be received (62) by the playback device including a "PLAY" instruction to continue playback and a "STOP" instruction to cease playback. As is discussed further below, the ability of a playback server to stop playback on a playback device enables the playback device to enforce concurrency requirements across multiple playback devices associated with a user. The combination of the play event reports and the event playback instructions can also be utilized by the playback server to enable a second playback device to resume playback of content at the last playback location reported by a first playback device. In this way, a user can seamlessly move between playback devices without the need to seek to a location to continue playback.

Although a specific process is illustrated in FIG. 3, any of a variety of processes can be utilized for requesting a customized top level index file and playing back content in accordance with embodiments of the invention. Playback servers and processes for automatically generating index files in accordance with embodiments of the invention are Automatic Generation of Top Level Indexes Playback servers in accordance with embodiments of the invention maintain a database of assets associated with specific pieces of content and can be configured by a playback management application to retrieve and filter information concerning assets to automatically generate a top level index file for a specific playback device. The databases maintained by the playback servers can list the name of the file containing the asset, and the content delivery network(s) on which the asset is located. When the asset is a video stream, the database can describe characteristics of the video stream including (but not limited to) a language associated with the video stream, the maximum bitrate at which the video stream is encoded, the frame rate of the video stream, the resolution and/or sample aspect ratio of the video stream. When the asset is an audio stream, the database can describe characteristics of the audio stream including (but not limited to) the language of the audio stream, the encoding of the audio stream and the bandwidth requirements of the audio stream. When the asset is a subtitle stream, the database can describe characteristics of the subtitle stream including (but not limited to) the language of the subtitle stream, the encoding of the subtitle stream and the bandwidth requirements of the subtitle stream. In addition to maintaining information concerning assets, the playback device can maintain information concerning playback capabilities of playback devices. In a number of embodiments, the information concerning playback capabilities of different playback devices is indexed using a product ID. In many embodiments, the playback device also maintains information concerning rules regulating the usage of different assets based upon criteria including (but not limited to) the type of playback device, the playback capabilities of a playback device, the location of the playback device (e.g. country/region), and/or requested language(s). Although specific pieces of information are described above as being associated in a database maintained by a playback server, any of a variety of pieces of information can be maintained in any of a variety of data structures to enable generation of a top level index file by a playback server in accordance with an embodiment of the invention. As is discussed further below, the information maintained by the playback server can be filtered in real time in response to a request for a top level index file from a playback device to generate a top level index file that only includes links to the assets that the playback device is permitted to playback.

Figure 4:
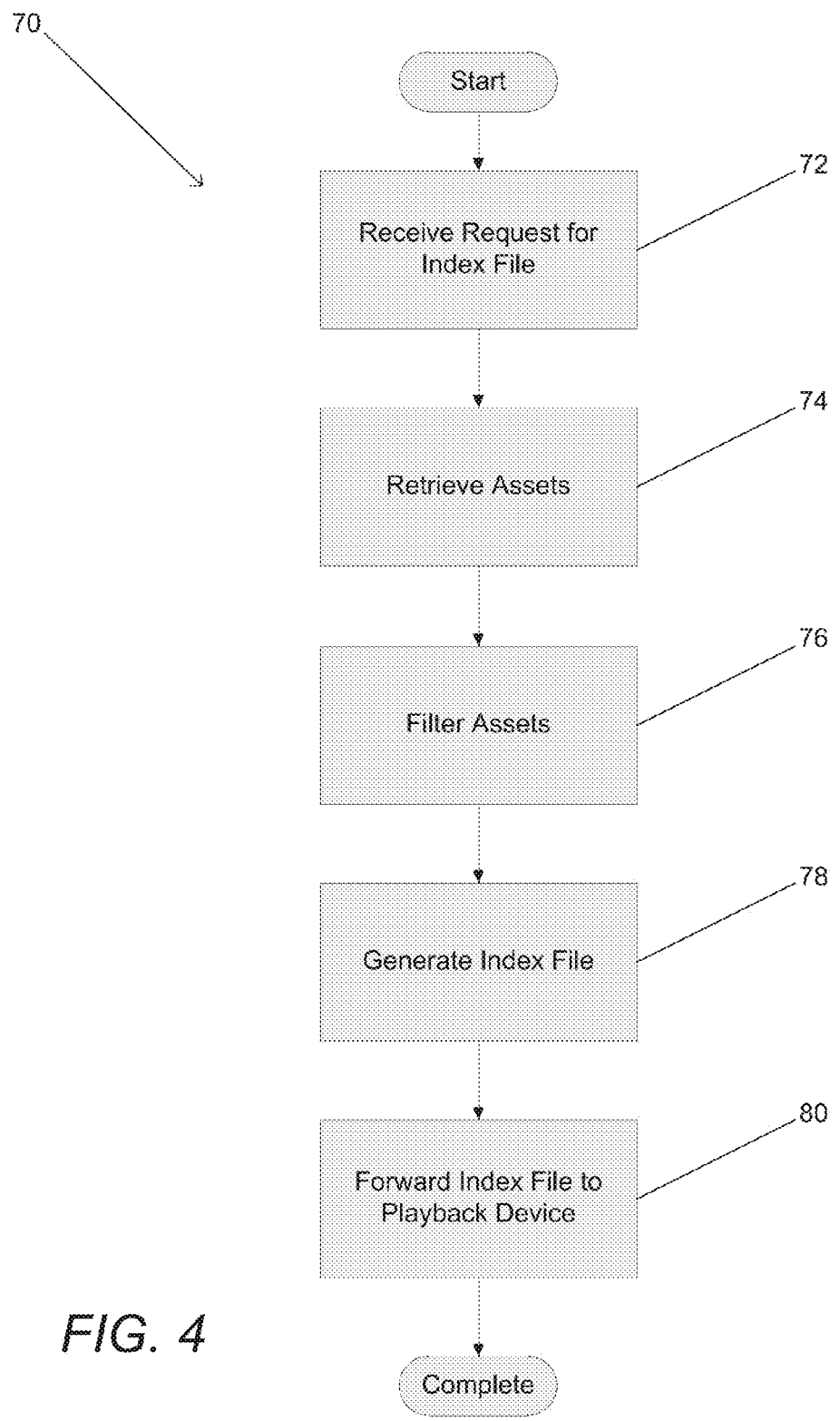
FIG. 4 is a flow chart illustrating a process for automatically generating a top level index file in accordance with an embodiment of the invention.

A process for generating a top level index file using information concerning assets associated with specific pieces of content maintained by a playback server in accordance with an embodiment of the invention is illustrated in FIG. 4. In the illustrated embodiment, the process 70 commences when the playback server receives (72) a request for a top level index file with respect to a specific piece of content from a specific playback device. As discussed above, the request can include information describing the playback device including (but not limited to) the playback capabilities of the playback device, a user account to which the playback device is registered, and information indicative of the geographic location of the playback device (e.g. the I.P. address of the playback device). In many embodiments, the capabilities of the playback device are identified using a product ID, which is associated with specific playback capabilities in a database accessible to the playback server.

The playback server retrieves (74) assets associated with the requested piece of content. The playback server filters (76) the assets based upon one or more filters associated with the capabilities of the playback device, the preferences of the user, and the requirements of the content owner. Accordingly, different top level index files can be generated with respect to the same content dependent on factors including (but not limited to) differences in playback capabilities between devices, differences in geographic location, and/or differences in language preferences associated with the playback devices. Processes for retrieving and filtering assets associated with a specific piece of content in accordance with an embodiment of the invention are discussed further below. Following filtering, the remaining assets can be utilized to generate (78) the top level index file, which can be provided (80) to the playback device. In a number of embodiments, the top level index file is securely forward using a secure communication technique including but not limited to Secure Socket Layer (SSL) communication or an equivalent secure communication protocol.

Although a specific process for generating a top level index file in accordance with an embodiment of the invention is illustrated in FIG. 4, any of a variety of processes involving collecting information concerning assets associated with a specific piece of content and generating an index file that indexes the assets that are to be made available to a playback device by an adaptive bitrate streaming system can be utilized in accordance with embodiments of the invention. Specific processes for filtering the assets that are included in a top level index file in accordance with embodiments of the invention are discussed below.

Filtering Assets for Inclusion in Top Level Index Files

Typically, more assets or streams are created than are necessary for adaptive bitrate streaming of content by a playback device. In many instances, video streams are created for different classes of playback device. For example, lower bitrate streams can be created for devices that will stream content over cellular data networks and higher bitrate streams can be created for devices that will stream content over a home network connected to the Internet via a high speed Internet connection. In addition, different video streams can be created with different aspect ratios and different audio streams can be created for different languages. In several embodiments, content stores offer premium high resolution content and a playback device that has only purchased lower resolution content is not permitted to access high resolution content. In many embodiments, specific streams may not be accessible in geographic regions. When a top level index file is created in real time in response to a request from a specific playback device, the playback server that creates the top level index file can initially gather information concerning the assets associated with a specific piece of content or title. The playback server can then apply one or more filters to the list of available assets to produce a list of assets that satisfies criteria including (but not limited to) criteria with respect to the capabilities of the playback device, the preferences of the user, and/or the requirements of the content owner.

Figure 5:
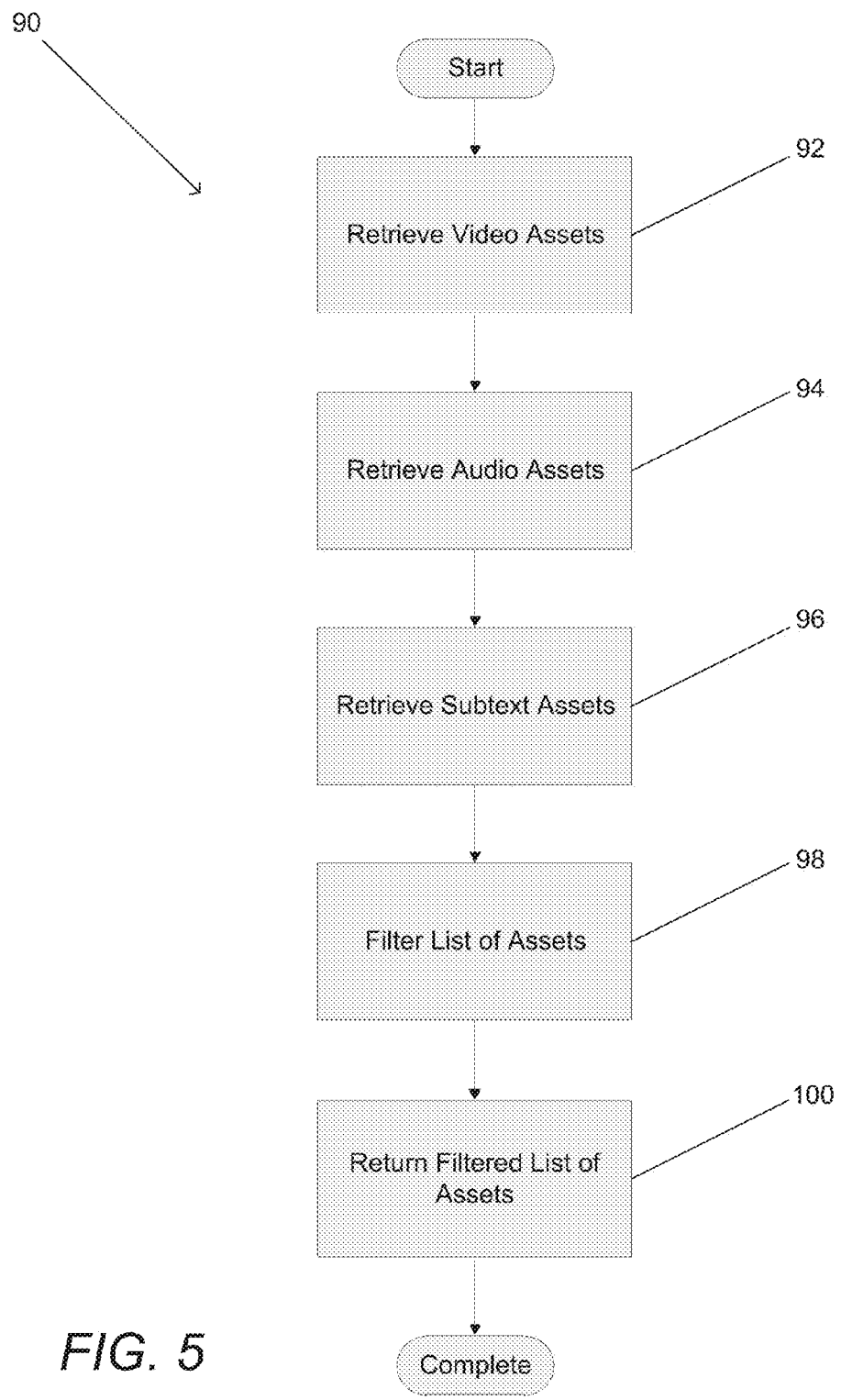
FIG. 5 is a flow chart illustrating a process for generating a list of streams for inclusion in an automatically generated top level index file in accordance with an embodiment of the invention.

A process for producing a list of assets to which a playback device is granted access in accordance with an embodiment of the invention is illustrated in FIG. 5. The process 90 includes retrieving video (92), audio (94), and/or subtitle or subtext (96) assets. In many embodiments, the process can also include retrieving other types of assets including (but not limited to) metadata assets and/or trick play stream assets. When the assets associated with a piece of content have been retrieved, the playback server can filter (98) the assets to exclude assets that are not capable of being played back by the playback device, not permitted to be played back, or are not desired to be played back.

The information concerning assets associated with the content collected by the playback server can include information concerning assets that are both capable of being played back by the playback device and permitted to be played back by the content owner. However, the information may also include information concerning assets that the playback device is not permitted to playback, or assets that are not desired for playback by the user. Assets that may not be permitted for playback can include (but are not limited to) premium content assets that have not been purchased (e.g. a high definition video stream) or assets that are not permitted to be played back within a specific geographic location or region, assets that the playback device is incapable of playing back including (but to limited to) streams encoded in unsupported formats or using profiles and/or buffer sizes that are not supported by the playback device, or assets that the playback device is not securely capable of playing back (e.g. the playback device has an unencrypted digital output and a content provider is not willing to allow high definition content to be streamed to such a device). Assets that a user may not wish to playback include (but is not limited to) content in a language that is not relevant to a specific user, video assets having an aspect ratio that is not the same as the display aspect ratio of the playback device (where video assets are associated with the content that have the same aspect ratio as the device's display aspect ratio), content encoded at a resolution beyond the resolution of the playback device's display, and/or content encoded at a maximum bitrate exceeding the maximum data rate of the playback device's network connection. Although specific filters are discussed above, the criteria utilized by a playback server to filter (98) the initial list of assets to generate a list of assets for inclusion in a top level index file are only limited by the requirements of a specific adaptive bitrate streaming system.

Once filtering has been applied to the list of assets, a filtered list of assets can be returned (100) and used to generate a top level index file. In the illustrated embodiment, the filtered list of assets corresponds to the content streams that the playback server is permitting the playback device to access.

Although a specific process is illustrated in FIG. 5, any of a variety of processes can be utilized to retrieve and filter the assets that will be included in a top level index file as appropriate to the requirements of a specific application in accordance with an embodiment of the invention.

Generating a Top Level Index SMIL File

In a number of embodiments, the top level index file generated by a playback server in response to a request from a playback device is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams or assets available for by the playback device and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is as follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system, a VIDEO element that references a trick play track is indicated by the systemBaseProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemBaseProfile="DivXPlusTrickTrack"
    width="480"
    height="240">
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
    xml:lang="gem"
    <param
        name="reservedBandwidth"
        value="128"
        valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
    <param
        name="reservedBandwidth"
        value="32"
        valuetype="data" />
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWTICH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" version="3.0"
baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
```

```
                value="1000"
                valuetype="data" />
        </video>
    </switch>
    <audio
        src="http://cnd.com/audio.mkv"
        xml:lang="eng">
        <param
            name="header-request"
            value="1000"
            valuetype="data" />
        <param name="reservedBandwidth" value="128"
            valuetype="data" />
    </audio>
    <textstream
        src="http://cnd.com/subtitles.mkv"
        xml:lang="eng">
        <param
            name="header-request"
            value="1000"
            valuetype="data" />
        <param name="reservedBandwidth" value="32"
            valuetype="data" />
    </textstream>
    </par>
</body>
</smil>
```

When the playback device receives a top level index SMIL file, the playback device can parse the SMIL file to identify the available streams. The playback device can then select initial stream and can use the SMIL file to identify the portions of the container file to download to obtain information concerning the encoding of a specific stream and/or to obtain an index to the encoded media within the container file.

Figure 6:
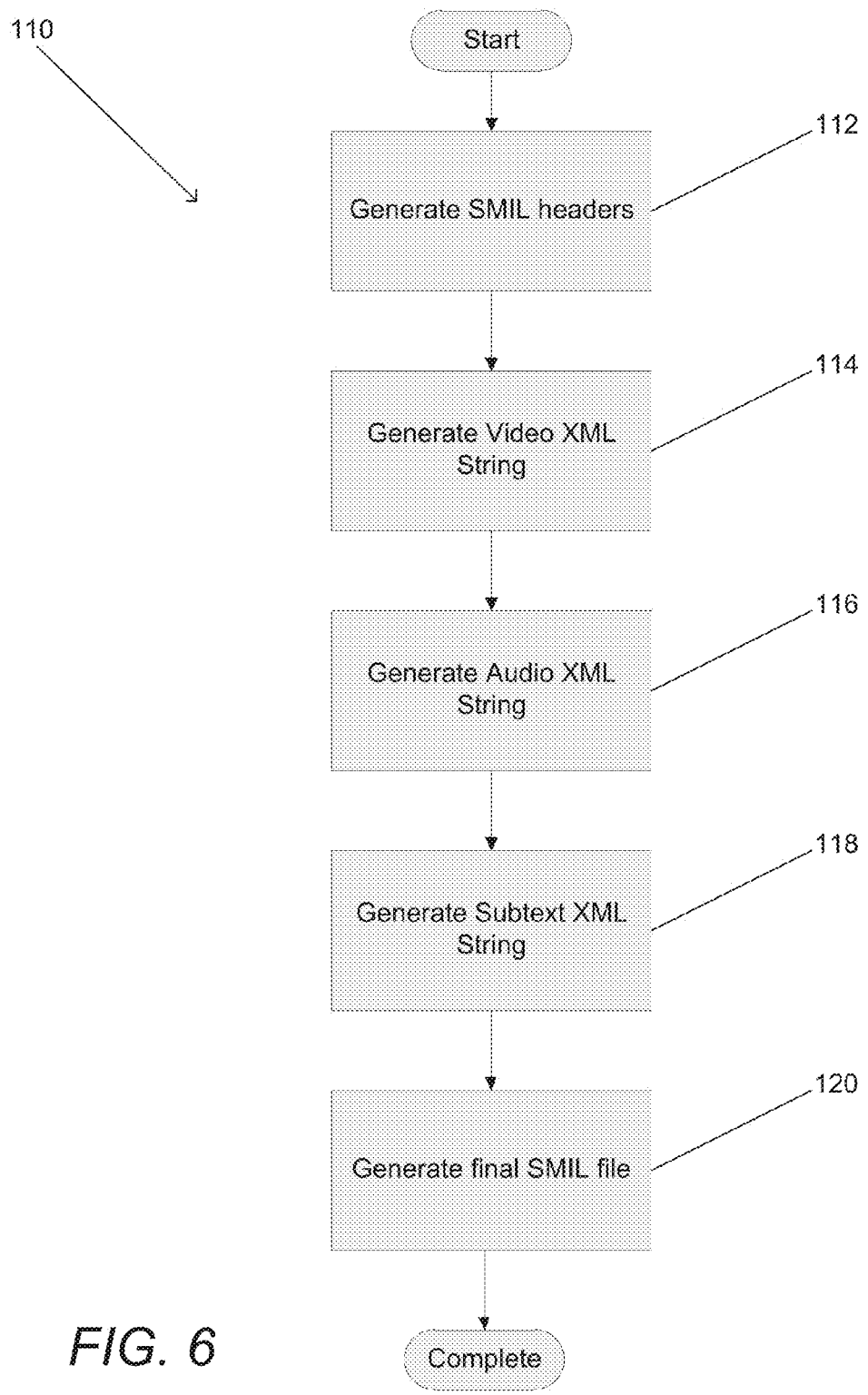
FIG. 6 is a flow chart illustrating a process for generating a SMIL file containing a top level index in accordance with an embodiment of the invention.

A process for building a top level index SMIL file in accordance with an embodiment of the invention is illustrated in FIG. 6. The process 110 involves generating (112) headers for the SMIL file, and generating XML strings for the video (114), audio (116), subtitle/subtext (118) and/or any other assets (e.g. trick play streams, metadata streams) that are in the list of assets that the playback server is permitting the playback device to access. At which point, the finalized SMIL file is generated (120).

An assetID is assigned to audio and text streams to uniquely identify the stream. This value is passed up to the server so the server knows the exact audio, subtitle stream being played.

```
        <param
            name="assetID"
            value="123456"
            valuetype="data" />
```

Although top level index SMIL files are described above, any of a variety of top level index file formats can be utilized to automatically create top level index files for a specific playback device as appropriate to a specific application in accordance with embodiments of the invention. The use of top level index files to enable playback of encoded media using adaptive bitrate streaming in accordance with embodiments of the invention is discussed further below.

Protected Streams

Some or all of the assets associated with a specific piece of content may be encrypted or technically protected. Digital Rights Management (DRM) systems enable the communication of cryptographic information to playback devices so that the playback device can access protected streams in the clear (i.e. in an unencrypted form). DRM systems that can be utilized in adaptive bitrate streaming systems in accordance with embodiments of the invention are described in U.S. patent application Ser. No. 13/340,632. In many embodiments, the playback server acts as a DRM server. In several embodiments, the playback server is configured to obtain cryptographic information from the playback server.

Figure 7:
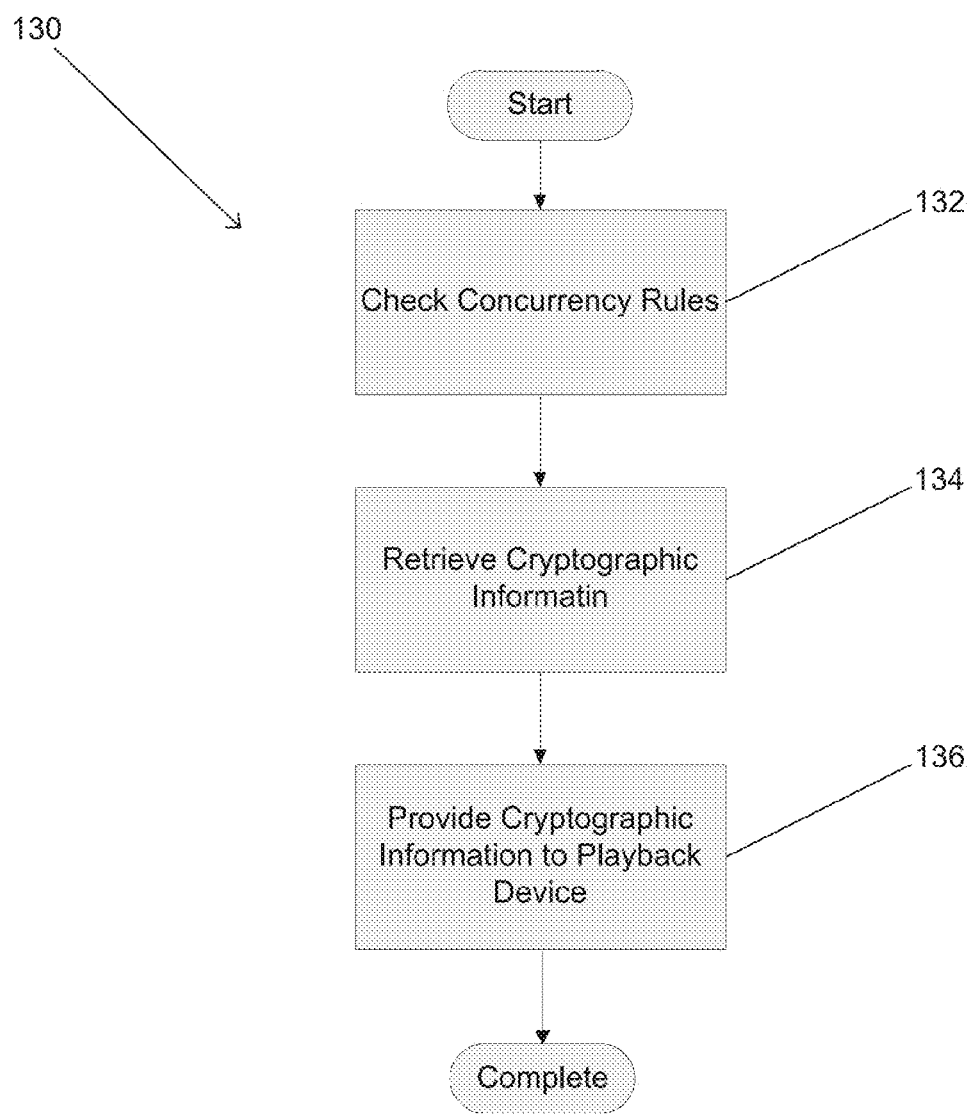
FIG. 7 is a flow chart illustrating a process for providing cryptographic information to a playback device in accordance with an embodiment of the invention.

A process for providing cryptographic information to a playback device in accordance with an embodiment of the invention is illustrated in FIG. 7. The process 130 includes checking (132) concurrency rules to confirm that the number of devices on which the user is currently playing back content and/or that have requested the right to playback the content is less than a predetermined concurrency limit. Assuming that the concurrency rules are satisfied, the process retrieves (134) cryptographic information enabling access to the protected streams associated with the specific piece of content being accessed by the playback device. A playback server can generate the cryptographic information or obtain the cryptographic information from a DRM server. The cryptographic information is then provided (136) to the playback device.

In many embodiments, the playback device includes cryptographic information that is locally stored on the playback device. The device cryptographic information is typically issued to the playback device at the time the playback device is first registered with the playback server and/or a DRM server. In several embodiments, the content cryptographic information provided to the playback device is encrypted so that it can be accessed using the playback device's device cryptographic information. In other embodiments, any of a variety of different techniques can be utilized to securely provide the playback device with cryptographic information to access protected streams.

Although a specific process for providing cryptographic information to a playback device in FIG. 7, any of a variety of processes can be utilized in accordance with embodiments of the invention. In addition, the playback device can obtain cryptographic information from a DRM server in a process that is entirely independent from the playback server and/or the automatic generation of a top level index file. Once a playback device has the necessary cryptographic information to playback protected streams of content, the playback device can commence playback. During playback, the playback device can provide periodic play event reports to the playback server. The generation and handling of play event reports in accordance with embodiments of the invention are discussed further below.

Play Event Reports

Playback devices in accordance with embodiments of the invention can generate play event reports periodically and/or in response to specific events such as (but not limited to) receipt of user instructions (e.g. play, stop, pause commands). The information that can be included in an event report typically includes the streams being accessed by the playback device and the current playback location in one or more of the streams. In several embodiments, the event report includes (but is not limited to) the time, the audio, and/or subtitle assetIDs, and/or a bandwidth measurement. The playback location can be utilized to resume playback of the content. The server can utilize play events to perform a variety of functions including (but not limited to) enabling playback to shift from one device to another device. When a user commences playing content on a first device and then commences playback of the same content on a second device, the playback server can provide the second playback device with the current playback location from the most recent play event report from the first device. The second playback device can then use the playback location information to resume playback of the content. In this way, the user can seamlessly transition from viewing content on a first playback device to a second playback device.

Figure 8:
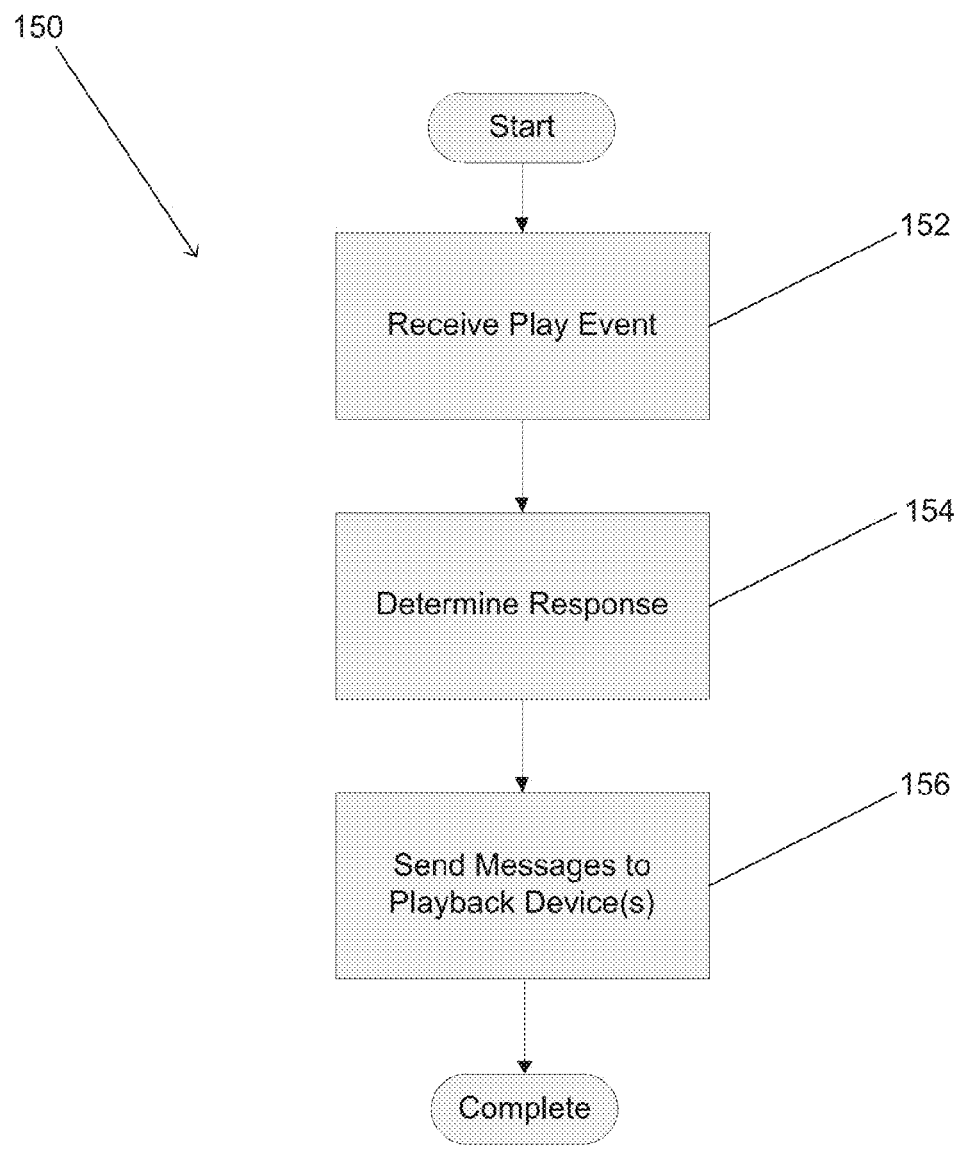
FIG. 8 is a flow chart illustrating a process for handling play events received from playback devices in accordance with an embodiment of the invention.

A process for handling play event reports in accordance with an embodiment of the invention is illustrated in FIG. 8. The process 150 includes receiving (152) play event reports and determining the appropriate response. In embodiments where there are concurrency limits, the response to a play event report may be to instruct the playback device to "STOP" playback of the content in response to a request to playback content on another device that exceeds a predetermined concurrency limit. Where the content is rented, the playback may exceed the rental period and the playback server can instruct the playback device to "STOP" playback. The playback server could also instruct the playback device to request content from alternative streams or to switch to accessing content on a different content delivery network, which may involve transmitting a new top level index file. In several embodiments, the playback server can instruct the playback device to display an error message or string. Typically, however, the response is to instruct the playback device to continue to play the content. The specific conditions under which a playback server will suspend playback or allow playback to continue are determined based upon the requirements of a specific application. The response is sent (156) to the playback device and the playback device manages playback accordingly.

Although a specific process for handling play event reports is illustrated in FIG. 8, any of a variety of process for handling play event reports appropriate to the requirements of a specific application can be utilized in accordance with embodiments of the invention.

Communicating During Adaptive Streaming

Figure 9:
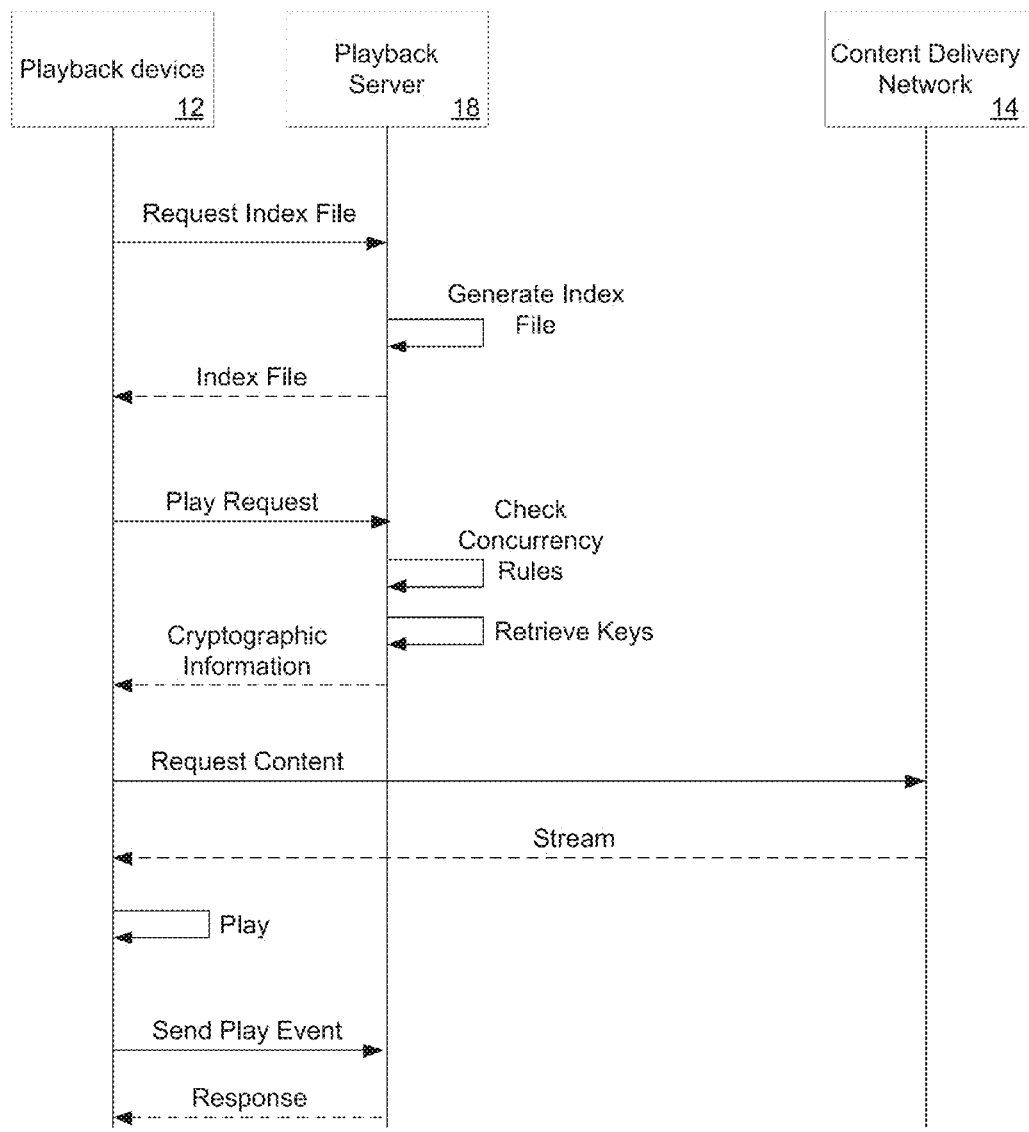
FIG. 9 is a timing diagram illustrating communication between a playback device and a playback server and a content distribution network during an adaptive bitrate streaming process that utilizes an automatically generated top level index file in accordance with an embodiment of the invention.

Processes are described above for automatically generating a top level index file in response to a request to access content from a playback device. A timing diagram illustrating communication between a playback device, a playback server, and a content delivery network during the adaptive bitrate streaming of content in accordance with an embodiment of the invention is illustrated in FIG. 9. The timing diagram shows a playback device 12 requesting an index file from a playback server 18. The playback server responds to the request by generating a top level index file using a process similar to the process outlined above. The playback server 18 provides the top level index file to the playback device 12, which then sends a playback request to the playback server. The playback server checks concurrency rules and retrieves cryptographic information enabling playback of protected streams. The cryptographic information is provided to the playback device 12. The playback device can then use the top level index file to request content from a content delivery network 14. In many embodiments, the playback device utilizes adaptive bitrate streaming to obtain the content from the content delivery network server(s). The playback device 12 can utilize the cryptographic information received from the playback server 18 to access protected streams of content in the clear and playback the content. During playback, the playback device 12 sends playback event reports to the playback server. The playback server 18 processes the play event report and sends a response to the playback device 12, which may cause the playback device to perform any of a variety of functions including (but not limited to) suspending playback of the content.

Although a specific sequence of communication is illustrated in FIG. 9, playback devices, playback servers, and content delivery networks can communicate in any of a variety of ways appropriate to a specific application in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method of generating a top level index file, comprising:
   receiving a request from a playback device at a playback server system, where the request (i) identifies a piece of content and (ii) includes a product identifier;
   retrieving, using the playback server system, (i) a list of assets associated with the identified piece of content and (ii) at least one device capability based upon the product identifier, wherein each asset is a different stream associated with the piece of content;
   filtering the list of assets using the at least one device capability using the playback server system, wherein the playback server system maintains a database of product identifiers and associated device capabilities;
   generating a top level index file describing each asset in the filtered list of assets using the playback server system; and
   sending the top level index file to the playback device using the playback server system, wherein the top level index file is used by the playback device to determine which assets to request for playback on the device.

2. The method of claim 1 further comprising filtering the list of assets based upon at least one of a geographic location of the playback device, a language associated with the playback device, one or more user preferences, and one or more requirements of a content owner.

3. The method of claim 1, wherein the at least one device capability is at least one of a: display aspect ratio, anticipated maximum network connection data rate, device outputs, supported formats, device buffer size, device resolution, device region, and device language.

4. The method of claim 1, wherein the playback server system maintains a database of assets associated with specific pieces of content.

5. The method of claim 1, wherein the top level index file describes at least a bitrate of each asset in the filtered list of assets and identifies locations of the assets in the filtered list of assets.

6. The method of claim 5, wherein the top level index file is a SMIL file.

7. The method of claim 6, further comprising generating an XML string including a SWITCH element to describe alternative streams for use in adaptive bitrate streaming.

8. The method of claim 6, further comprising generating an XML string including an EXCL element to describe alternative streams for use in conventional streaming.

9. The method of claim 6 further comprising generating an XML string including a URI for each asset, wherein the URI references a container file and the XML string for each assets includes an element that defines the size of a header section of the container file.

10. The method of claim 6, wherein the XML string includes an element that identifies the encoding of the asset.

11. The method of claim 6, wherein the XML string of a video asset includes at least one element selected from the group consisting of:
- an element that describes the maximum bitrate of the video;
- an element that describes the width and height of the video; and
- an element that describes the video buffer verifier size of the video.

12. The method of claim 1, wherein each asset is a different alternative stream associated with the piece of content and each alternative stream encodes the piece of content at a different maximum bitrate.

13. A playback server system, comprising:
- a database that stores descriptions of assets associated with specific pieces of content;
- a database that stores a plurality of product identifiers and associated device capabilities;
- a processor configured using a playback management application;
- wherein the playback management application configures the processor to:
  - receive a request from a playback device, where the request (i) identifies a piece of content and (ii) includes a product identifier;
  - retrieve (i) a list of assets associated with the identified piece of content and (ii) at least one device capability based upon the product identifier, wherein each asset is a different stream associated with the piece of content;
  - filter the list of assets using the at least one device capability;
  - generate a top level index file describing each asset in the filtered list of assets; and
  - send the top level index file to the playback device, wherein the top level index file is used by the playback device to determine which assets to request for playback on the device.

14. The playback server system of claim 13, wherein the playback management application further configures the processor to filter the list of assets based upon at least one of a geographic location of the playback device, a language associated with the playback device, one or more user preferences, and one or more requirements of a content owner.

15. The playback server system of claim 13, wherein the at least one device capability is least one of a: display aspect ratio, anticipated maximum network connection data rate, device outputs, supported formats, device buffer size, device resolution, device region, and device language.

16. The playback server system of claim 13, wherein the top level index file describes at least a bitrate of each asset in the filtered list of assets and identifies locations of the assets in the filtered list of assets.

17. The playback server system of claim 16, wherein the top level index file is a SMIL file that is an XML file that includes a list of URIs describing each of the different streams associated with the piece of content and container files that contain the streams.

18. The playback server system of claim 13, wherein each asset is a different alternative stream associated with the piece of content and each alternative stream encodes the piece of content at a different maximum bitrate.

* * * * *

(12) INTER PARTES REVIEW CERTIFICATE (3452nd)
United States Patent
Braness et al.

(10) Number: US 9,270,720 K1
(45) Certificate Issued: Feb. 14, 2024

(54) SYSTEMS AND METHODS FOR AUTOMATICALLY GENERATING TOP LEVEL INDEX FILES

(71) Applicants: Jason Braness; Evan Wallin; Ederson Ferreira

(72) Inventors: Jason Braness; Evan Wallin; Ederson Ferreira

(73) Assignee: DIVX, LLC

Trial Number:

IPR2020-00647 filed Mar. 11, 2020

Inter Partes Review Certificate for:

Patent No.: 9,270,720
Issued: Feb. 23, 2016
Appl. No.: 14/336,392
Filed: Jul. 21, 2014

The results of IPR2020-00647 are reflected in this inter partes review certificate under 35 U.S.C. 318(b).

INTER PARTES REVIEW CERTIFICATE
U.S. Patent 9,270,720 K1
Trial No. IPR2020-00647
Certificate Issued Feb. 14, 2024

AS A RESULT OF THE INTER PARTES REVIEW PROCEEDING, IT HAS BEEN DETERMINED THAT:

Claims 1-5 and 12 are found patentable.

* * * * *